(12) United States Patent
Reich et al.

(10) Patent No.: US 8,396,447 B2
(45) Date of Patent: Mar. 12, 2013

(54) EMERGENCY CALL NOTIFICATION SYSTEM AND METHOD

(76) Inventors: Don Reich, Oxnard, CA (US); Kurt Warner, Carpinteria, CA (US)

( * ) Notice: Subject to any disclaimer, the term of this patent is extended or adjusted under 35 U.S.C. 154(b) by 0 days.

(21) Appl. No.: 13/220,472

(22) Filed: Aug. 29, 2011

(65) Prior Publication Data

US 2012/0052837 A1   Mar. 1, 2012

Related U.S. Application Data

(60) Provisional application No. 61/377,895, filed on Aug. 27, 2010.

(51) Int. Cl.
*H04M 11/04* (2006.01)
(52) U.S. Cl. ............... 455/404.1; 455/404.2; 455/412.2; 379/37
(58) Field of Classification Search ............... 455/404.1, 455/404.2, 407, 412.2; 379/37–51
See application file for complete search history.

(56) References Cited

U.S. PATENT DOCUMENTS

| | | | | |
|---|---|---|---|---|
| 5,805,670 A | * | 9/1998 | Pons et al. | 379/45 |
| 6,151,385 A | * | 11/2000 | Reich et al. | 379/49 |
| 2002/0042846 A1 | * | 4/2002 | Bottan et al. | 709/249 |
| 2004/0203622 A1 | * | 10/2004 | Esque et al. | 455/412.1 |
| 2008/0189721 A1 | * | 8/2008 | Buchanan | 719/318 |
| 2008/0304630 A1 | * | 12/2008 | Nguyen et al. | 379/45 |
| 2009/0291663 A1 | * | 11/2009 | Schultz et al. | 455/404.2 |
| 2010/0048159 A1 | * | 2/2010 | Stenquist | 455/404.1 |
| 2010/0190468 A1 | * | 7/2010 | Scott et al. | 455/404.2 |
| 2010/0291894 A1 | * | 11/2010 | Pipes | 455/404.2 |
| 2011/0028118 A1 | * | 2/2011 | Thomas | 455/404.1 |
| 2011/0230210 A1 | * | 9/2011 | Drennan | 455/456.3 |

OTHER PUBLICATIONS

International Search Report for International application No. PCT/US12/52611 dated Nov. 2, 2012.
Written Opinion for International application No. PCT/US12/52611 dated Nov. 2, 2012.

* cited by examiner

*Primary Examiner* — Jinsong Hu
*Assistant Examiner* — Magdi Elhag
(74) *Attorney, Agent, or Firm* — Brinks Hofer Gilson & Lione

(57) ABSTRACT

A system and method for automatically notifying others when a 9-1-1 emergency call has been placed from a cellular phone. The user selects the people who she would like to be contacted in the case of an emergency. The contact information (e.g., phone numbers and email address) for these notification contacts are entered into an application resident on the phone. In the event of an emergency, the application connects the user to the 9-1-1 system and automatically notifies the user's predetermined list of contacts via email and/or text notification. These notifications preferably contain the user's name, telephone number, current location, and the date/time of the 9-1-1 call.

20 Claims, 4 Drawing Sheets

EMERGENCY CALL NOTIFICATION SYSTEM AND METHOD

CROSS REFERENCE TO RELATED APPLICATIONS

This application claims priority to U.S. Provisional Application No. 61/377,895, filed on Aug. 27, 2010, the entirety of which is incorporated herein by reference.

FIELD OF THE INVENTION

The present invention generally relates to systems and methods for the processing of emergency 9-1-1 calls, and more particularly to systems and methods for processing of emergency 9-1-1 calls from mobile devices.

BACKGROUND OF THE INVENTION

Virtually since the invention of the telephone by Alexander Graham Bell in 1876, it has been recognized that a unique telephone number for notifying authorities of emergencies (crime, fire, injury . . . ) would be a tremendous boon to public health and safety.

Britain implemented its first emergency telephone system in 1937 using the number 999. This British system serving police, fire and Emergency Medical Service (EMS) was developed after fatal delays in phone calls reporting a fire on Wimpole Street. In 1957 the National Association of Fire Chiefs in the United States suggested a single number for reporting fires. In 1958 New Zealand instituted its 111 emergency telephone number. In 1959 the police department in Winnipeg Canada introduced North America's first emergency telephone system. President Lyndon Johnson's Commission on Law Enforcement and Administration of Justice issued a report in 1967 that recommended a single number for emergency calls that should be used nationwide.

In cooperation with AT&T (the predominant telephone carrier at that time), the designation of 9-1-1 as a universal emergency number was announced in January of 1968. The first 9-1-1 system was adopted in California in 1970. In the mid 1970s California's Alameda County launched the first 9-1-1 system that provided for selective routing of 9-1-1 calls. Prior to this pilot project, all 9-1-1 calls were routed according to "hard wired" instructions in the switching systems of the telephone companies. This original pilot program provided the county's Public Safety Answering Points (PSAPs) with the Automatic Number Identification (ANI) of the caller.

Although the selective routing of 9-1-1 calls has evolved and, for the most part, has worked very well for landline telephones, the prevalence of wireless communication devices (cell phones) presents new challenges.

The number of subscribers in the United States using wireless services grew from 55 million in 1997 to 253 million in 2007. Worldwide there are 2.3 billion wireless subscribers. Eight percent of the United States population uses cell phones with a volume of 2 trillion wireless minutes in 2007. Twelve point eight percent of United States households are "wireless only." Californians alone placed 23.3 million 9-1-1 calls in 2007. Of these, 11.6 million (50%) were made from wireless devices. Current estimates are that 58% of 9-1-1 calls are wireless.

In an emergency situation, the first instinct of these cell phone users is top call 9-1-1 using their cellular devices. Their next thoughts can be to call loved ones or others to inform them of the emergency situation. This entails remembering the loved ones phone numbers, or looking them up on the phone's favorite contacts list and dialing the number. In an emergency or other stressful situation, this can be difficult and sometimes impossible.

SUMMARY OF THE INVENTION

The present invention is a system and method for automatically notifying others when a 9-1-1 emergency call has been placed from a cellular phone. The present invention allows the user to stay connected to the people that matter most to them in the case of emergency. The system and method provides a quick, accessible menu to store all of the user's emergency numbers as well the feature to automatically notify one or more contacts in the user's contact list when 9-1-1 has been dialed from the phone.

This feature of the present invention connects the user to the 9-1-1 system and automatically notifies the user's predetermined list of contacts via email and/or text notification. These notifications preferably contain the user's name, telephone number, current location, and the date/time of the 9-1-1 call.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
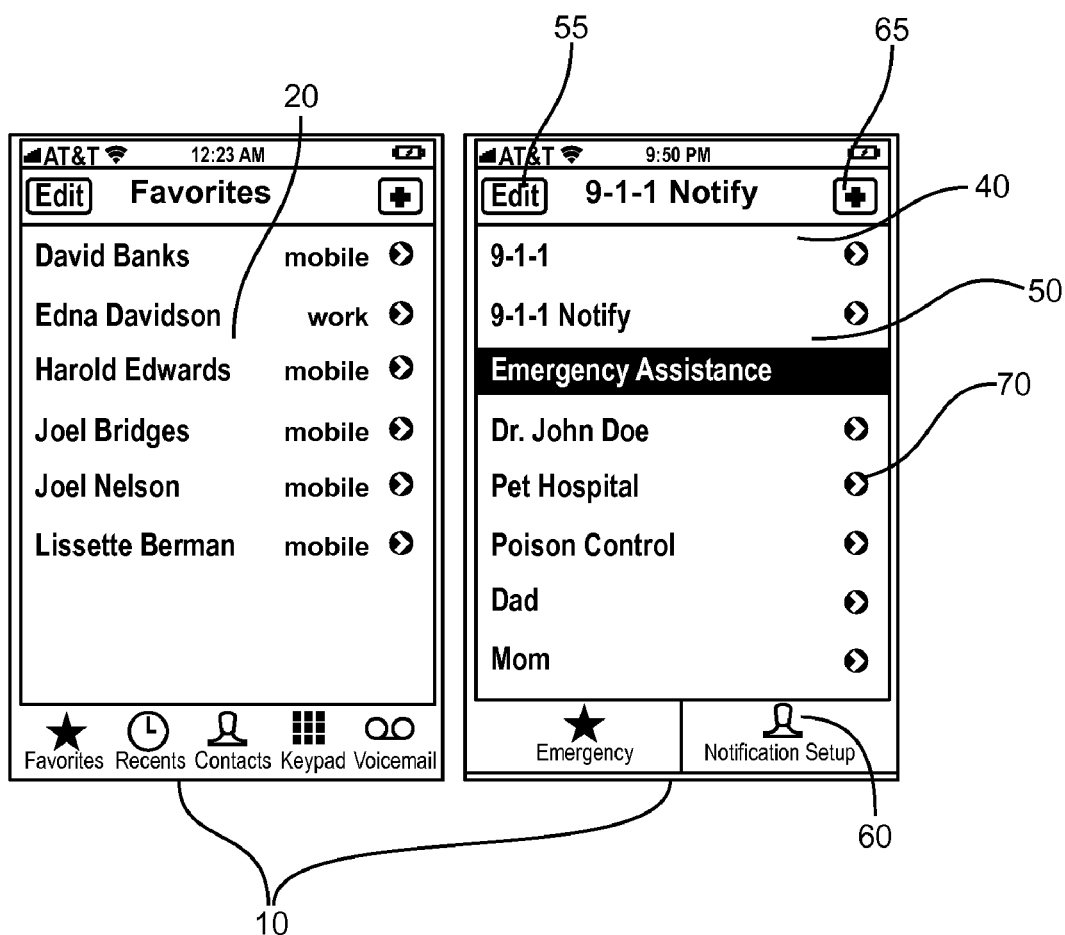
FIG. 1 illustrates a user interface of the present invention on a mobile device.

The present invention has been designed to be simple and familiar, two beneficial elements in an emergency situation. In a preferred embodiment, the invention is, in part, embodied as an application on a user's mobile cellular device. FIG. 1 illustrates a user interface 30 of the present invention on such a mobile device 10 When a user opens the application of the present invention, the user interface 30 looks similar to the user's familiar "Favorites" menu 20 for placing phone calls, with one-touch immediate dialing. Users do not have to guess how the basic functions of the present invention work, as they are presumably already familiar with the functionality of their "Favorites" interface 20 and would have no issues navigating the user interface 30 of the present invention.

On the main tab of the interface 30 is the one-touch dial list. On the bottom part of the interface 30, one or more emergency numbers from their phones contact list is displayed, such as a doctor or veterinarian. This list is essentially a subset of the user's contact list, but for phone numbers called in emergency situations. In the top half of interface 30, there are two 9-1-1 emergency call options. By activating the one touch dialing of entry 40, the device 10 calls "9-1-1" in the traditional manner without notifying any of the user's notification contacts. By activating the one touch dialing of entry 50, "9-1-1 Notify", the device 10 calls "9-1-1" and an email and/or text message is sent to a user defined notification contact list, as further described below.

The reason for the inclusion of the traditional 9-1-1 entry 40 is that oftentimes the user will dial 9-1-1 as a Good Samaritan rather than for a personal emergency. For example, if the user is reporting a drunk driver on the highway, the user's contacts on its notification contact list do not need to be informed and alarmed by this action. Alternately, if the user is reporting a more sensitive or private emergency, such as domestic violence, the user does not have to worry about getting others involved through the "9-1-1 Notify" feature of the present invention. In a preferred embodiment, the "9-1-1" and the "Notify 9-1-1" numbers 40 and 50 cannot be edited or moved around on the interface 30.

The second tab 60 at the bottom of the interface 30 is "Notification Setup." This tab opens a second user interface where all the pertinent information for the "9-1-1 Notify" features of the present invention is entered, such as the user's notification contacts. In a preferred embodiment, the user can choose contacts directly out of their device 10 address book or can alternatively manually input a new contact. In a preferred embodiment, users can provide up to three contacts to notify. In a commercial embodiment of the present invention, the user is given the option to purchase more contacts directly in the application.

The notification contacts' information preferably includes the notification contacts' phone numbers (preferably ones that are text message enabled) and the notification contacts' email addresses.

Once the notification contacts have been entered, the user is given a choice to send a "test" notification during the setup process. This test notification makes the chosen emergency contacts aware of the program and its purpose. This test notification also provides the notification contacts the opportunity to speak up if they do not want to be notified, a concern of some people. Once the notification setup has been completed and the notification contacts' information has been entered, the application is fully functional.

The emergency contacts such as a doctor, local pet hospital, etc., on interface 30 can be edited, deleted, and moved around on the list. An EDIT button 55 can be used to move the added contacts or delete them and the "+" button 65 can be used to add additional contacts. The arrow link 70 next to each of the emergency contacts links the user to a page e to edit the contact information. On this page the user can also share this contact info via text message, email, or peer to peer Bluetooth.

Figure 2:
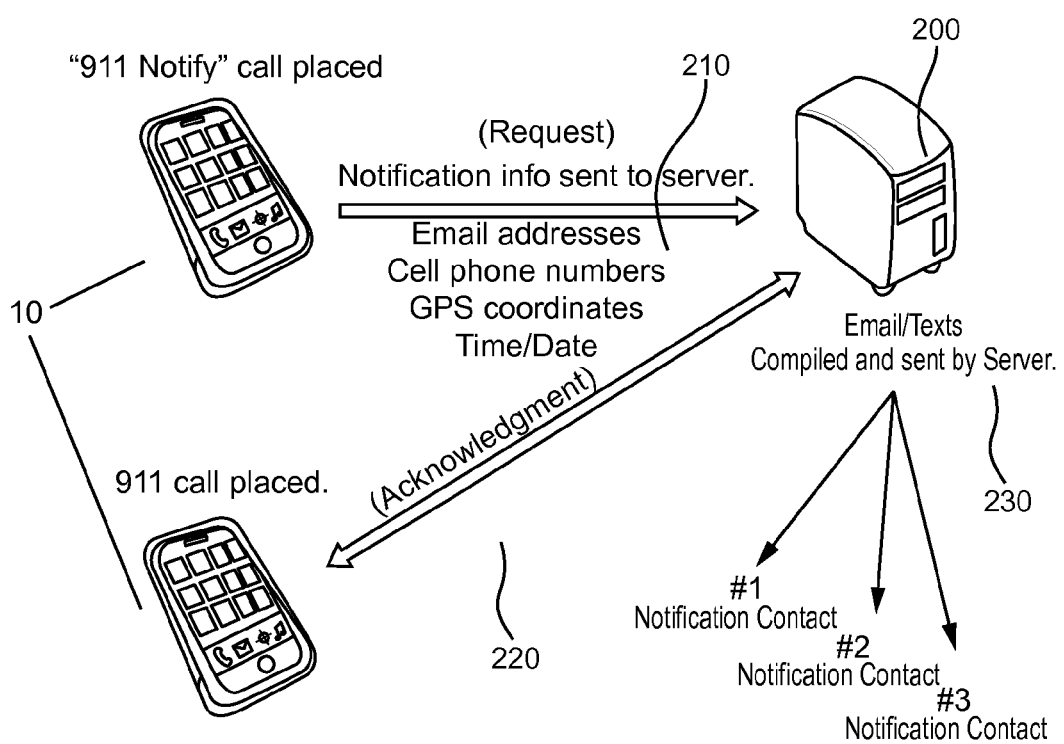
FIG. 2 illustrates the system and an exemplary flow of the present invention.
Figure 3:
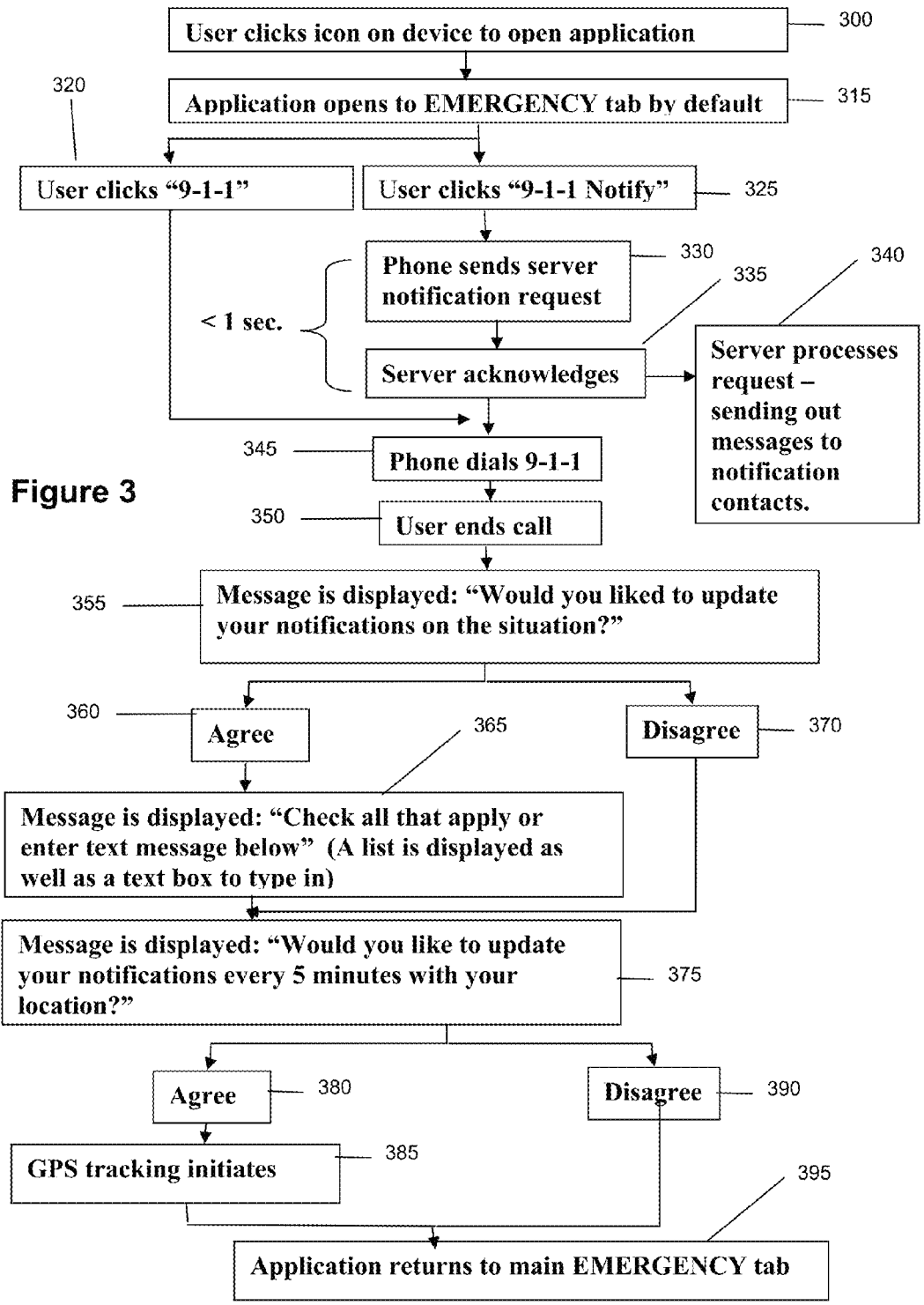
FIG. 3 is a flowchart for making an emergency call and notifications.

FIGS. 2 and 3 illustrate the system and an exemplary flow of the present invention. The system is comprised of the user's device 10, appropriately programmed as described above. Although only one device is shown, it is appreciated that the system can support a plurality of devices. In a preferred embodiment, device 10 is Global Positioning System (GPS) enabled. By using the GPS feature of device 10, the present invention is able to include the user's geographic location when sending out its notification messages to the notification contacts.

The system further includes a server 200 (or several servers, as required, depending on the number of users and the level of use). Connecting the user's device 10 and the server 200 is a communication network, preferably a cellular telephone network.

As described above, the user activates the present invention by pressing on a predefined icon on device 10 (step 300). The application resident on the device 10 opens (step 315) to the user interface 30 (FIG. 1). If the user wants to make a Good Samaritan type 9-1-1 call, she presses (step 320) the "9-1-1" autodial entry 40 (FIG. 1). The device 10 will call 9-1-1 (step 345) in response to this action by the user.

If the user wants to employ the notify feature of the present invention, she presses (step 325) the "9-1-1 Notify" entry (50 in FIG. 1) on the user interface. In response to this user' activation, a request 210 is sent (step 330) to the server 200. The request 210 includes the notification contacts' information (e.g., email addresses, cell phone numbers), the GPS coordinates of the device 10 (i.e., the user's location) and date and time. Upon receipt of the request 210 from device 10, the server 200 processes the request 210 and performs at least two actions. First, it sends (step 335) an acknowledgement 220 back to device 10. Once device 10 receives the acknowledgement 220, it immediately dials 9-1-1 (step 345) to allow the user to contact the emergency services. The time from when the device 10 sends the request 210 to the server 200 to the time the server 200 sends back an acknowledgement, is less than one second. This portion of the process of the present invention will not add any significant delay to the 9-1-1 call being placed from the device. In its second process, the server 200 generates the notifications 230 to each of the user's notification contacts (step 340). These notifications can me made by either email, text message or both. An example of such a notification is:

This is an emergency notification that John Doe has placed a 9-1-1 call from his cell phone (310) 555-1234 at 2468 Main Street, Los Angeles, Calif. on Jun. 1, 2011 at 1:35 pm. Emergency services have been dispatched.

In an alternative embodiment, given the increasing use of social networks (Facebook, Twitter, etc.) the emergency notification messages can be posted on these outlets as well.

In an alternative embodiment, the device 10 can first make the call to 9-1-1 before it sends the request to the server 200. The potential problem with this embodiment is that, depending on the emergency, the 9-1-1 operator may want to keep the user on the line until the emergency services people reach the user. This will delay the request from being sent to the server 200 and the notifications being sent out to the notification contacts.

In a further embodiment, the device 10 can both send the notifications directly to the notification contacts, as well as making the 9-1-1 call. However, this is not a preferred embodiment in light of the potential for the user being connected to a high latency unreliable wireless network. If the user is connected to such a network at the time of the emergency, the device 10 will have significant difficulty in trying to send out all the data for the e-mail, text, and dialer requests before it can start the user's emergency call. Each request adds overhead because of poor network latency, which may add up to a painfully noticeable delay between the tap and the start of the call.

In light of the occurrence of this unacceptable delay, it is preferred that the present invention be enabled using the server 200 model as depicted in FIG. 1. This scalable server infrastructure off-loads the work of sending all the notification messages form the device 10. In this model, the phone sends the single, small request 210 to server 210. The server 200 can then immediately send the small acknowledgment 220 back to the device 10 and begin servicing the request by sending out the appropriate messages (step 340). Meanwhile, the device 10 has received the acknowledgment 220 in just one round-trip's latency and may begin the 9-1-1 call.

Figure 4:
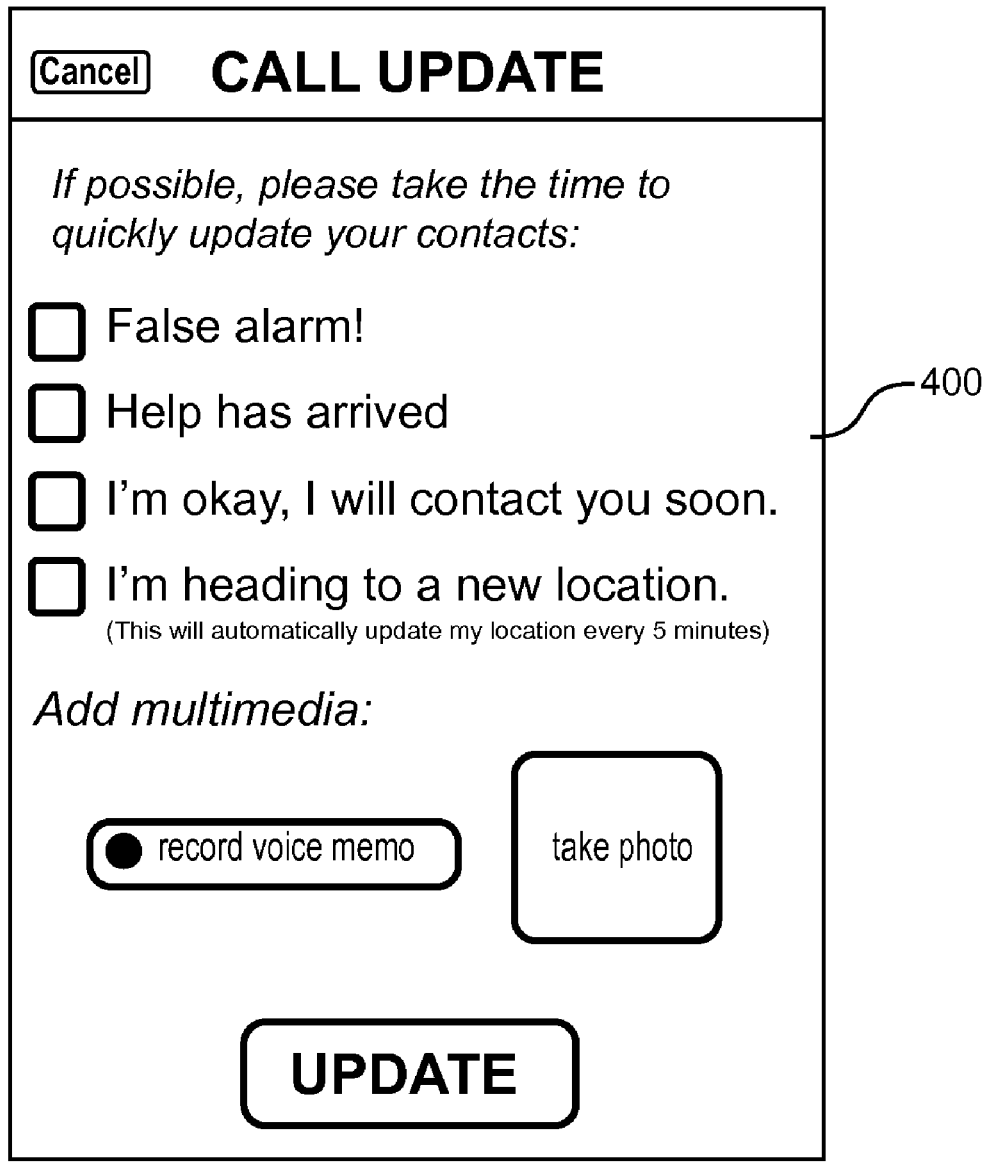
FIG. 4 illustrates a user interface for providing updates to notified contacts.

In step 350, the phone call to the 9-1-1 services has been completed and the user hangs up. The application of the present invention then presents a message to the user (step 355) asking whether she would like to send update messages to the notification contacts. If the user does not (step 370) the process continues at step 375. If the user does want to update her contacts on her situation, she is preferably presented (step 365) with a screen 400, such as illustrated in FIG. 4. This screen 400 will appear when the application is automatically reopened after the emergency call has been completed. Using this screen 400, the user can provide a quick update to her notification contacts of the situation. The user interface 400 is preferably in a check box format that provides for easy user entry (again, this is presumably in an emergency situation where the user has already dialed 9-1-1). The user can click all that apply to the situation or, alternatively check the OTHER option to type in her own message. This update feature of the present invention also provides the ability to add a short recorded message or photo of the incident to include in the update that is to be sent to the notification contacts. The periodic updates can be sent by either the device 10 or server 200.

Using the GPS capabilities of the device 10, the present invention is capable of automatically sending the user's notification contacts updates on the user's location. The application asks (step 375) whether the user would like these automatic location updates to be sent. If she doesn't (step 390), the process exits at step 395. If the user does want these location updates to be sent, she agrees (step 380) and the GPS tracking capability is initiated (step 385). Once the tracking is initiated, the user will be returned to the main interface screen 30.

An additional feature of the present invention is that when an emergency phone call is initiated, application will keep a record of the incident in a logs file. An interface to this log file can be set up in the same list format as the main interface 30. When an incident occurs, it will be named according to date and branch called (e.g., Jun. 21, 2009 POLICE called) and be placed in the list. The user is able to drill down in the entries in the log list of calls to display a page full of information including the date, time, and location of the call, the branch called, the successful transmission of notifications, and any information from the CALL UPDATE screen after the call was made. This log file can be emailed to the user.

In additional features, the present invention provides a login screen for Facebook and/or any other social networks. Users can login to their accounts within the application and be directed to a 9-1-1 Notify group. On this page users are free to socialize about incidents, the application software, emergency contacts, or anything related to the features of this application.

In additional features, the present invention has a mobile map system, such as Google™ maps built in. Using this map facility, a user can search for emergency information such as nearest hospitals, emergency phone numbers, etc. Using this feature, once such a facility is located, the user has the ability to store the number of the facility (e.g., hospital) directly to the user's emergency contacts page.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method, using a cellular device, for contacting 9-1-1 and notifying at least one contact of an emergency comprising:
   receiving an identification of the at least one contact to be notified;
   receiving contact information related to the at least one contact;
   receiving an indication of the emergency;
   automatically, in response to the receipt of the indication of the emergency, sending a notification to the at least one contact using the contact information;
   receiving, at the cellular device, an acknowledgement of receipt of the notification; and
   automatically, in response to the receipt of the indication of the emergency, calling 9-1-1.

2. The method according to claim 1, wherein the contact information comprises a telephone number of the at least one contact.

3. The method according to claim 1, wherein the contact information comprises an email address of the at least one contact.

4. The method according to claim 1, further comprising:
   the cellular device sending a notification request to a server; and
   the server sending the notification to the at least one contact.

5. The method according to claim 4, wherein the notification request from the cellular device includes the contact information.

6. The method according to claim 4, further comprising:
   the server sending an acknowledgement to the cellular device after receipt of the notification request; and
   the cellular device automatically contacting 9-1-1 after receipt of the acknowledgement.

7. The method according to claim 1, further comprising sending a notification update to the at least one contact.

8. The method according to claim 1, further comprising sending automatic periodic notification updates to the at least one contact.

9. The method according to claim 8, further comprising:
   the cellular device obtaining location information indicating a location of the cellular device, wherein the periodic notification updates include the location information.

10. The method according to claim 1, further comprising:
    the cellular device obtaining location information indicating a location of the cellular device.

11. The method according to claim 10, wherein the notification includes the location information.

12. A method for contacting 9-1-1 and notifying at least one contact of an emergency comprising:
    receiving, by a cellular device, an indication of the emergency;
    the cellular device sending, without user action, a request to a server, the sending being in response to the receipt of the indication of the emergency;
    the server, sending an acknowledgement back to the cellular device and sending a notification to the at least one contact; and
    after receipt of the acknowledgement, the cellular device calling, without user action, 9-1-1.

13. The method according to claim 12, further comprising:
    receiving contact information related to the at least one contact, wherein the contact information is sent by the cellular device with the request to the server and wherein the server uses the contact information to send the notification to the at least one user.

14. The method according to claim 12, further comprising:
    the cellular device obtaining location information indicating a location of the cellular device, wherein the notification includes the location information.

15. The method according to claim 12, further comprising:
    the cellular device obtaining location information indicating a location of the cellular device; and
    sending automatic periodic notification updates to the at least one contact, wherein the periodic notification updates include the location information.

16. A system for contacting 9-1-1 and notifying at least one contact of an emergency comprising:

a cellular device, the cellular device operable to:
- receive an identification of the at least one contact to be notified,
- receive contact information related to the at least one contact,
- receive an indication of the emergency,
- automatically send a notification request in response to the receipt of the indication of the emergency, the notification request including the contact information,
- receive an acknowledgement of receipt of the notification, and
- in response to receipt of the acknowledgement, automatically contact 9-1-1; and a server, the server operable to:
- receive the notification request from the cellular device,
- send a notification to the at least one contact using the contact information, and
- communicate the acknowledgement of receipt of the notification to the cellular device.

17. The system according to claim 16 wherein the contact information comprises a telephone number or email address of the at least one contact.

18. The system according to claim 16 wherein the device sends automatic periodic notification updates to the at least one contact.

19. The system according to claim 16 further comprising:
- a Global Position System (GPS) section in the cellular device, the GPS section providing location information indicating a location of the cellular device, wherein the notification include the location information.

20. The system according to claim 19, wherein the device sends automatic periodic notification updates to the at least one contact and wherein the periodic notification updates include the location information.

* * * * *